(12) United States Patent
Hahn et al.

(10) Patent No.: US 7,533,616 B2
(45) Date of Patent: May 19, 2009

(54) GUIDING MAGNET SYSTEM AND MAGNETIC LEVITATION VEHICLE EQUIPPED THEREWITH

(75) Inventors: Wolfgang Hahn, Kassel (DE); Friedrich Loeser, Riemerling (DE)

(73) Assignee: ThyssenKrupp Transrapid GmbH, Kassel (DE)

(*) Notice: Subject to any disclaimer, the term of this patent is extended or adjusted under 35 U.S.C. 154(b) by 0 days.

(21) Appl. No.: 10/592,712

(22) PCT Filed: Mar. 9, 2005

(86) PCT No.: PCT/DE2005/000405

§ 371 (c)(1),
(2), (4) Date: Jul. 2, 2008

(87) PCT Pub. No.: WO2005/090117

PCT Pub. Date: Sep. 29, 2005

(65) Prior Publication Data

US 2008/0257197 A1     Oct. 23, 2008

(30) Foreign Application Priority Data

Mar. 15, 2004  (DE) ...................... 10 2004 012 747
Nov. 19, 2004  (DE) ...................... 10 2004 056 438

(51) Int. Cl.
B60L 13/06    (2006.01)
B60L 13/04    (2006.01)
(52) U.S. Cl. ...................... 104/284; 104/281
(58) Field of Classification Search .............. 104/281, 104/284, 283, 286, 288, 289, 293, 282, 290, 104/292, 294; 310/10, 12, 13; 335/296, 335/297, 298, 299, 300, 301, 302, 303, 304, 335/305, 306
See application file for complete search history.

(56) References Cited

U.S. PATENT DOCUMENTS

| | | | | |
|---|---|---|---|---|
| 3,865,043 A | * | 2/1975 | Schwarzler | 104/284 |
| 4,140,063 A | * | 2/1979 | Nakamura | 104/284 |
| 4,142,469 A | * | 3/1979 | Polgreen | 104/284 |
| 4,698,855 A | * | 10/1987 | Hicks | 2/402 |

(Continued)

FOREIGN PATENT DOCUMENTS

DE          39 28 277       12/1990

(Continued)

*Primary Examiner*—S. Joseph Morano
*Assistant Examiner*—Jason C Smith
(74) *Attorney, Agent, or Firm*—Michael J. Striker

(57) ABSTRACT

A guiding magnet system for a magnetic levitation vehicle is described. The guiding magnet system has a plurality of magnet arrangements (50, 51, 57) which each comprise a core (33) extending in the vehicle's longitudinal direction and have at least two winding levels (planes). In each winding plane an even number of windings (58, 60 or 59, 62) is provided. At one end of the magnet arrangements (50, 51, 57) two windings (e.g. 58*a*, 58*b*) each lying one behind the other but diagonally above each other and being connected in series, form a pair of windings linked to an assigned control circuit. At the other end of said magnet arrangement either also two such winding pairs or single winding pairs are provided which comprise two windings (60*a*, 60*b* or 61*a*, 61*b*) arranged one behind the other. Further, a magnetic levitation vehicle equipped with such a guiding magnet system is described (FIG. 10).

15 Claims, 9 Drawing Sheets

U.S. PATENT DOCUMENTS

Figure 1:
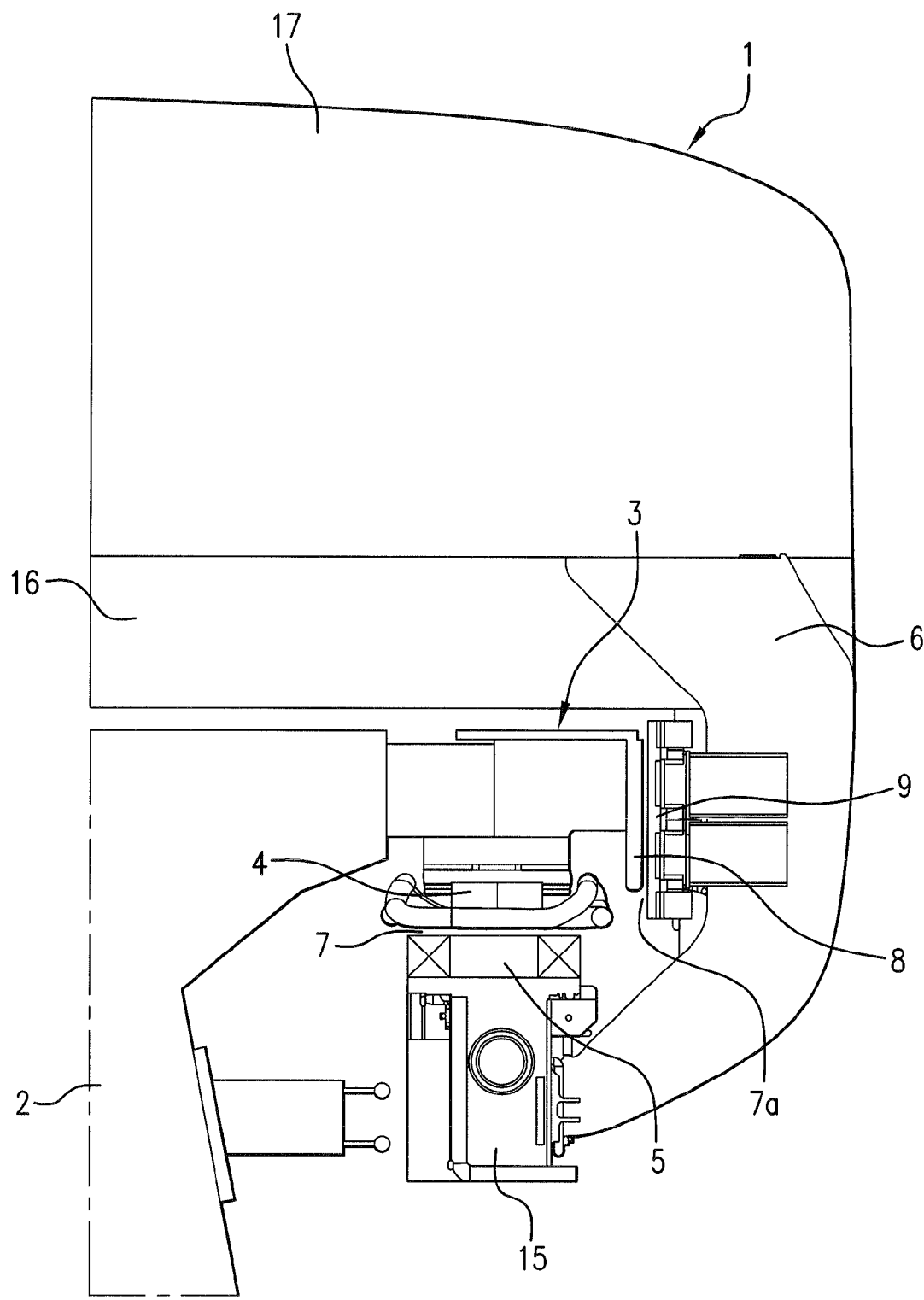

| | | | | |
|---|---|---|---|---|
| 4,698,895 A * | 10/1987 | Miller et al. | | 29/464 |
| 4,731,569 A * | 3/1988 | Bohn | | 318/687 |
| 5,053,654 A * | 10/1991 | Augsburger et al. | | 310/12 |
| 5,628,252 A * | 5/1997 | Kuznetsov | | 104/284 |
| 5,666,883 A * | 9/1997 | Kuznetsov | | 104/281 |
| 5,868,077 A * | 2/1999 | Kuznetsov | | 104/281 |
| 6,044,770 A * | 4/2000 | Davey et al. | | 104/282 |
| 6,357,359 B1 * | 3/2002 | Davey et al. | | 104/282 |
| 6,548,921 B2 * | 4/2003 | Ohta et al. | | 310/12 |
| 6,664,880 B2 * | 12/2003 | Post | | 335/306 |
| 6,758,146 B2 * | 7/2004 | Post | | 104/281 |
| 6,827,022 B2 * | 12/2004 | van den Bergh et al. | | 104/284 |
| 7,380,508 B2 * | 6/2008 | Li | | 104/284 |
| 2001/0048250 A1 * | 12/2001 | Ohta et al. | | 310/12 |
| 2005/0252407 A1 * | 11/2005 | Li | | 104/139 |
| 2006/0096495 A1 * | 5/2006 | Fischperer | | 104/281 |
| 2006/0097116 A1 * | 5/2006 | Fischperer | | 246/468 |
| 2006/0130699 A1 * | 6/2006 | Thornton et al. | | 104/284 |
| 2006/0219128 A1 * | 10/2006 | Li | | 104/284 |
| 2006/0243157 A1 * | 11/2006 | Li | | 104/281 |
| 2006/0243158 A1 * | 11/2006 | Li | | 104/281 |
| 2007/0095245 A1 * | 5/2007 | Li | | 104/284 |
| 2007/0131134 A1 * | 6/2007 | Post | | 104/284 |
| 2007/0169661 A1 * | 7/2007 | Hahn et al. | | 104/281 |
| 2008/0257197 A1 * | 10/2008 | Hahn et al. | | 104/282 |
| 2008/0257198 A1 * | 10/2008 | Beck et al. | | 104/284 |

FOREIGN PATENT DOCUMENTS

| | | |
|---|---|---|
| GB | 1 272 488 | 4/1972 |
| WO | 97/30504 | 8/1997 |

* cited by examiner

GUIDING MAGNET SYSTEM AND MAGNETIC LEVITATION VEHICLE EQUIPPED THEREWITH

Guiding magnet systems of this type serve the purpose of keeping a magnetic levitation vehicle within the track gauge, particularly during curve rides, and to control the magnet arrangements by the aid of control circuits and gap sensors assigned to them in such a manner that a gap hereinafter designated as guiding gap between their magnet poles and a lateral guiding rail is always maintained at a pre-selected value, e.g. 10 mm. With prior art guiding magnet systems, two groups of three guiding magnets each arranged in series and one braking magnet each located between these two groups are provided per vehicle or vehicle section in the longitudinal direction of the vehicle to serve this purpose. Each guiding magnet is formed by a magnet arrangement which has a core extending in the vehicle's longitudinal direction and two winding levels in which three windings each and gap sensors assigned to them are arranged behind each other. The six windings and a corresponding number of gap sensors in each magnet arrangement are so connected in series in pairs each and so connected to the control circuits that a far-reaching redundancy is obtained. This means that the two windings lying one above each other at those ends of a magnet arrangement which border a zone free from guiding magnets, i.e. which for example border a gap formed by a braking magnet or the front or rear end of the vehicle, are served by two different control circuits. At the same time, a redundant behavior at those ends of the magnet arrangements that border another magnet arrangement is achieved in that in case of a failure of the windings or control circuits located there the guiding function is taken over by the neighbored guiding magnet by feeding to the adjacent windings thereof a correspondingly higher current. However, due to the existing asymmetry, rolling moments around the vehicle's longitudinal axis will occur.

Apart from the above, the described guiding magnet systems fail to be sufficiently variable in various aspects. This relates both to the requirements with respect to redundancy in a given case and to the number of existing windings as well as the number of gap sensors to be mounted between them. Moreover, the length of existing windings and the weight of the guiding magnet system which is largely determined by its ferrous constituents on the whole fails to be the optimal.

The technical problem underlying this invention is to configure the guiding magnet system of the species designated hereinabove in such a way that higher flexibility without losing redundancy can be obtained with regard to the design of individual guiding magnets and their arrangement in a magnetic levitation vehicle, that the total weight of the guiding magnet arrangement can be reduced, and that rolling moments are avoided.

The invention bears the advantage that every magnetic arrangement and, therefore, every guiding magnet can be configured as an intrinsically redundant unit, if required. This means that on failure of any winding of any guiding magnet or of any control circuit assigned thereto, there is no need for a neighboring magnet to take charge of the guiding function of a defective winding. As an alternative, however, it is also possible to involve adjacent magnets as done hitherto to ensure redundancy, while reducing the total weight of each guiding magnet system substantially and configuring the arrangement in a way that rolling moments cannot occur. Furthermore, a magnetic levitation vehicle can be provided in which—despite a substantial reduction in weight of the magnet arrangement as compared with the prior art construction—ensures that additional load changes which would have to be taken-up by the guideway will not occur during operation of the magnetic levitation vehicle.

Other advantageous features of the present invention become evident in the sub-claims.

Figure 2:
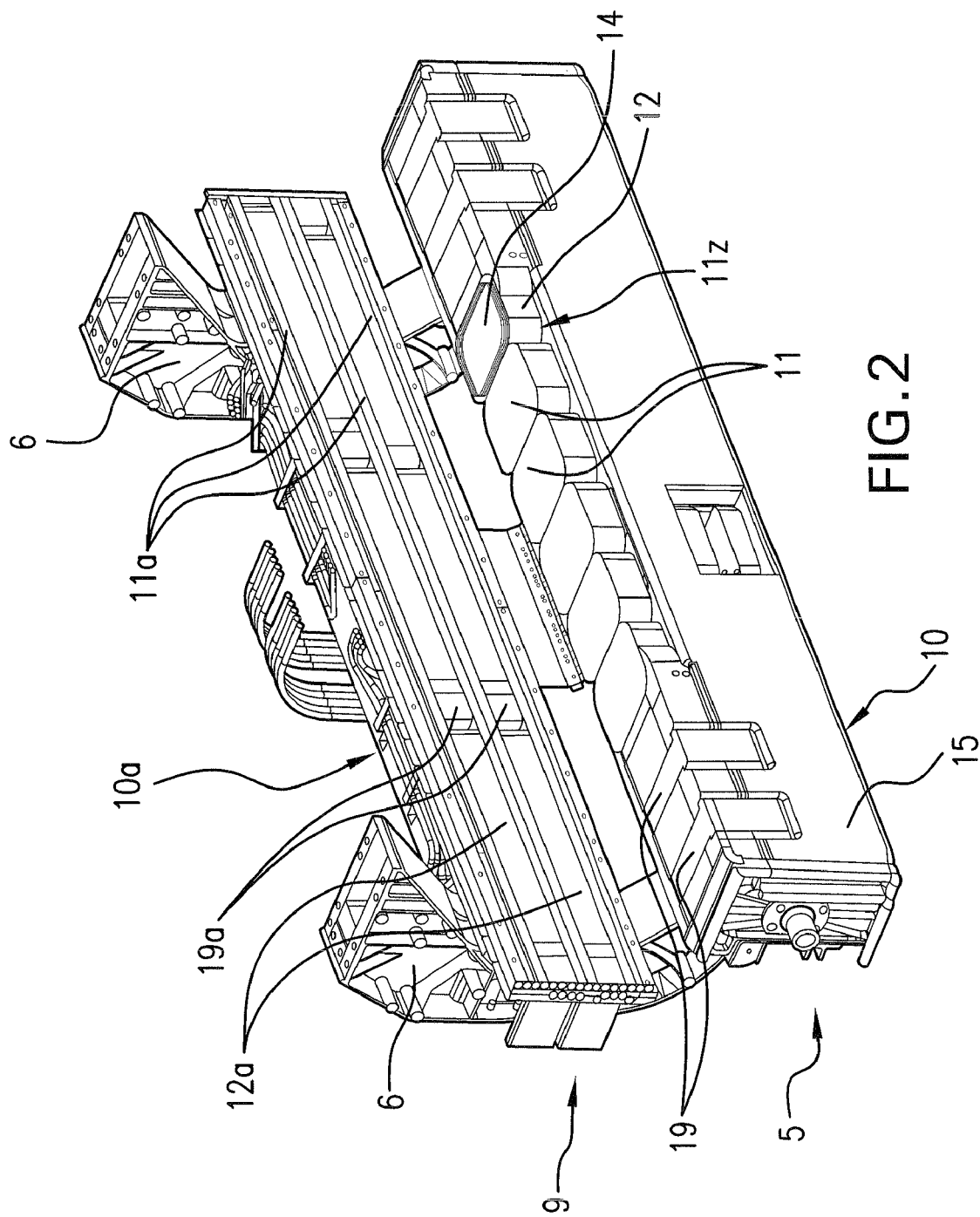
Figure 3:
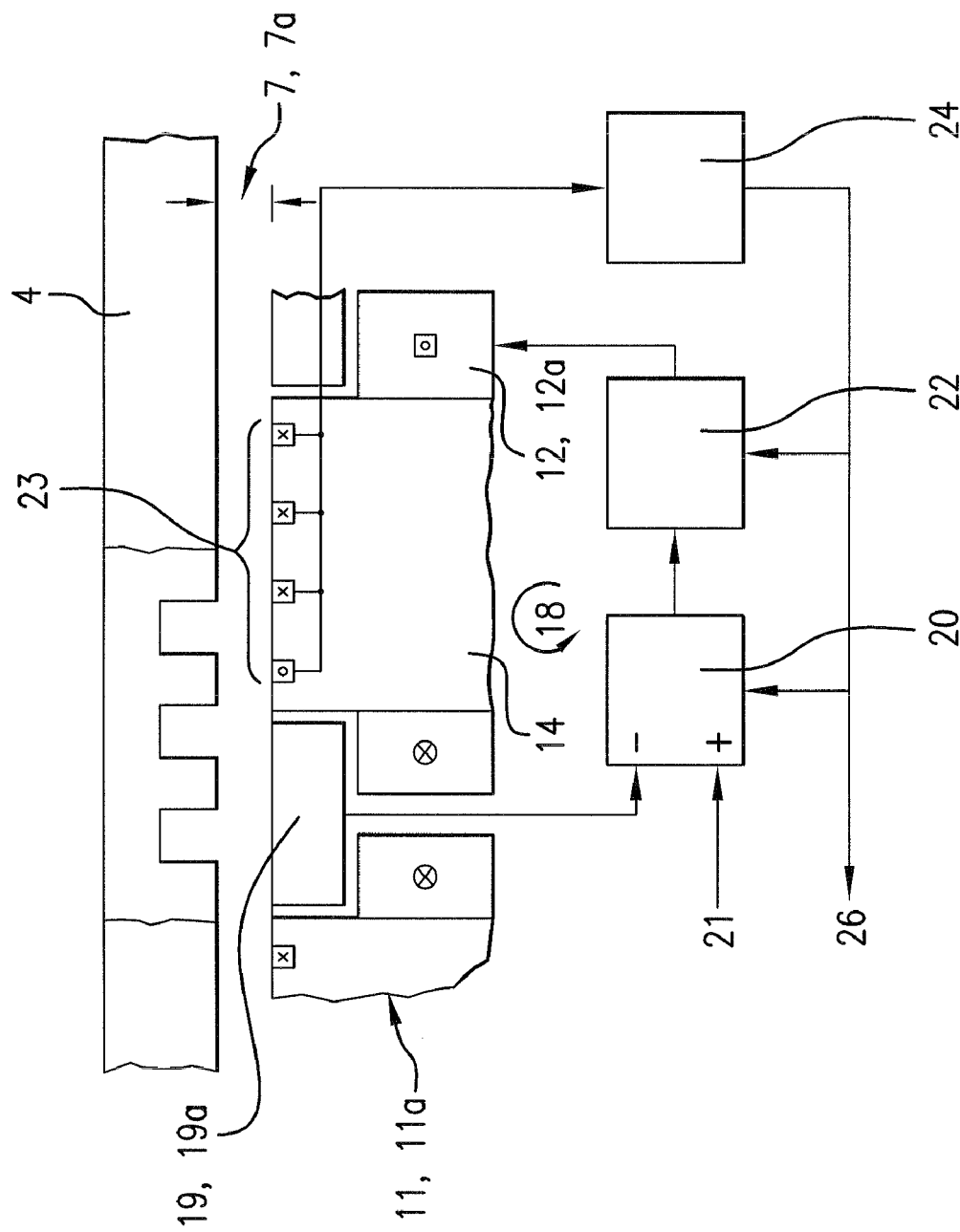
Figure 4:
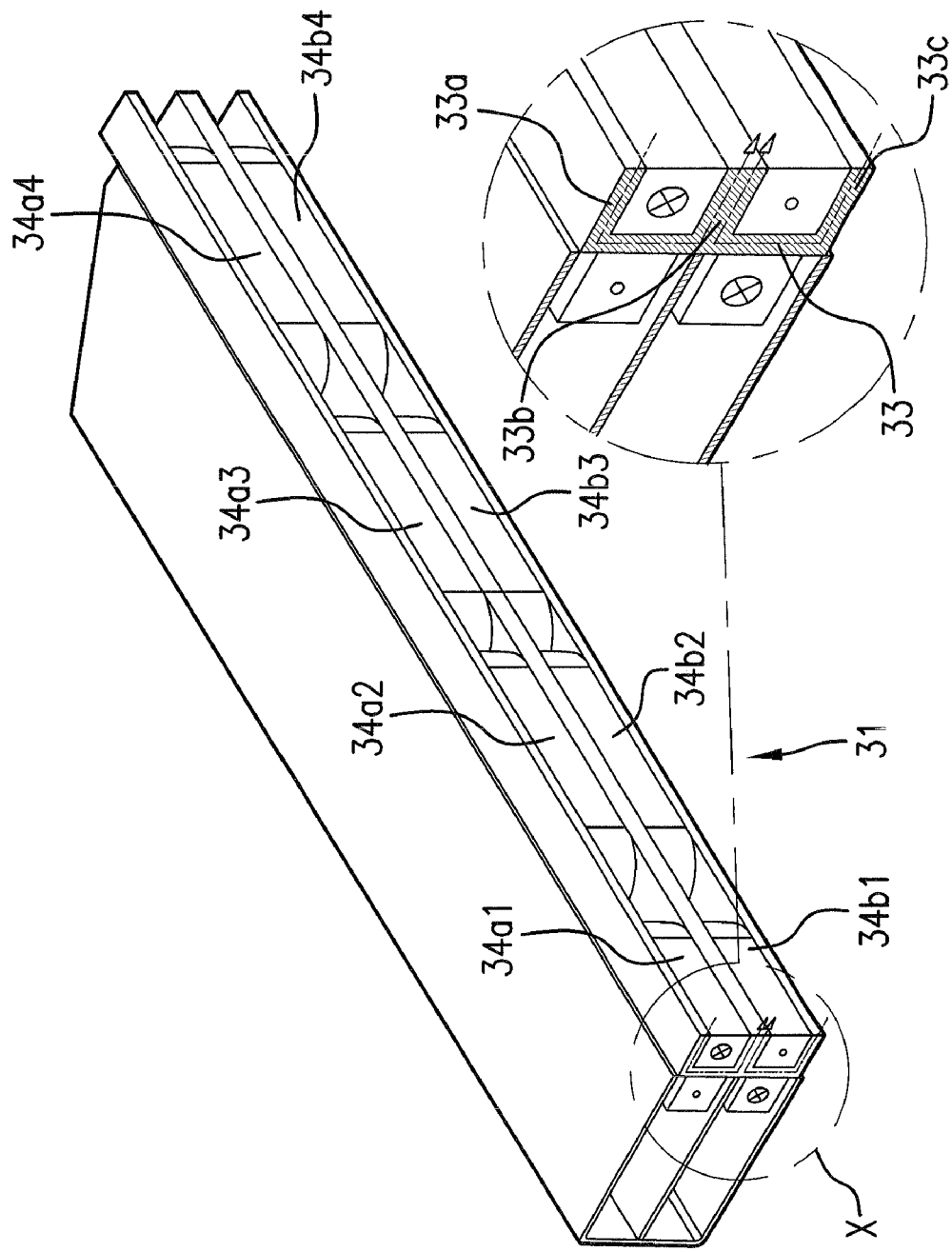
Figure 5:
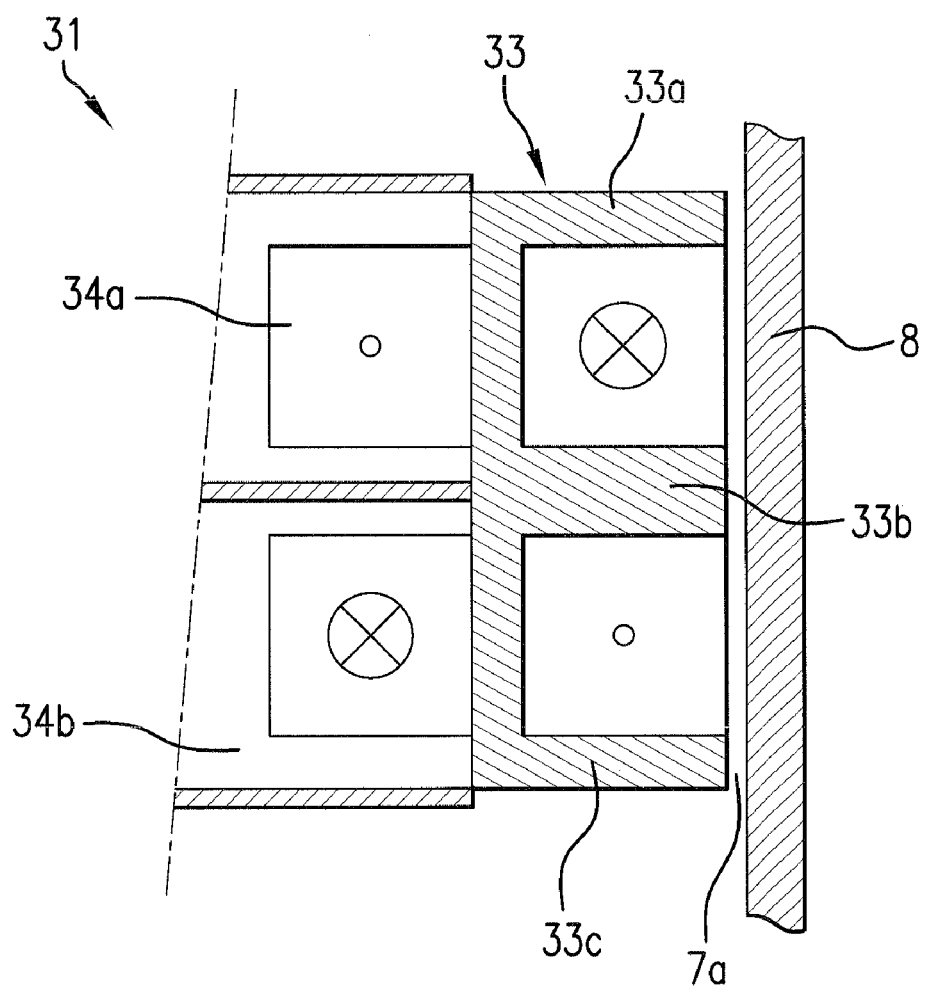
Figure 6:
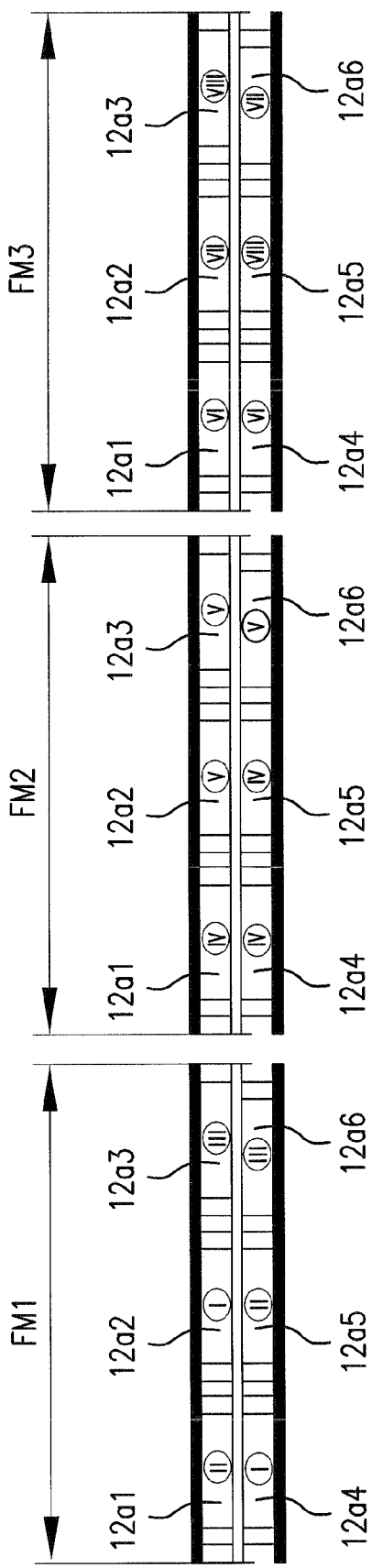
Figure 7:
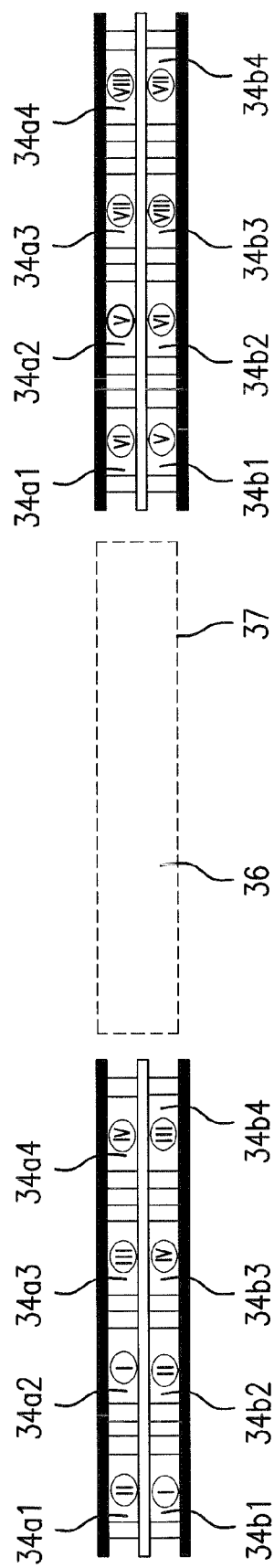
Figure 8:
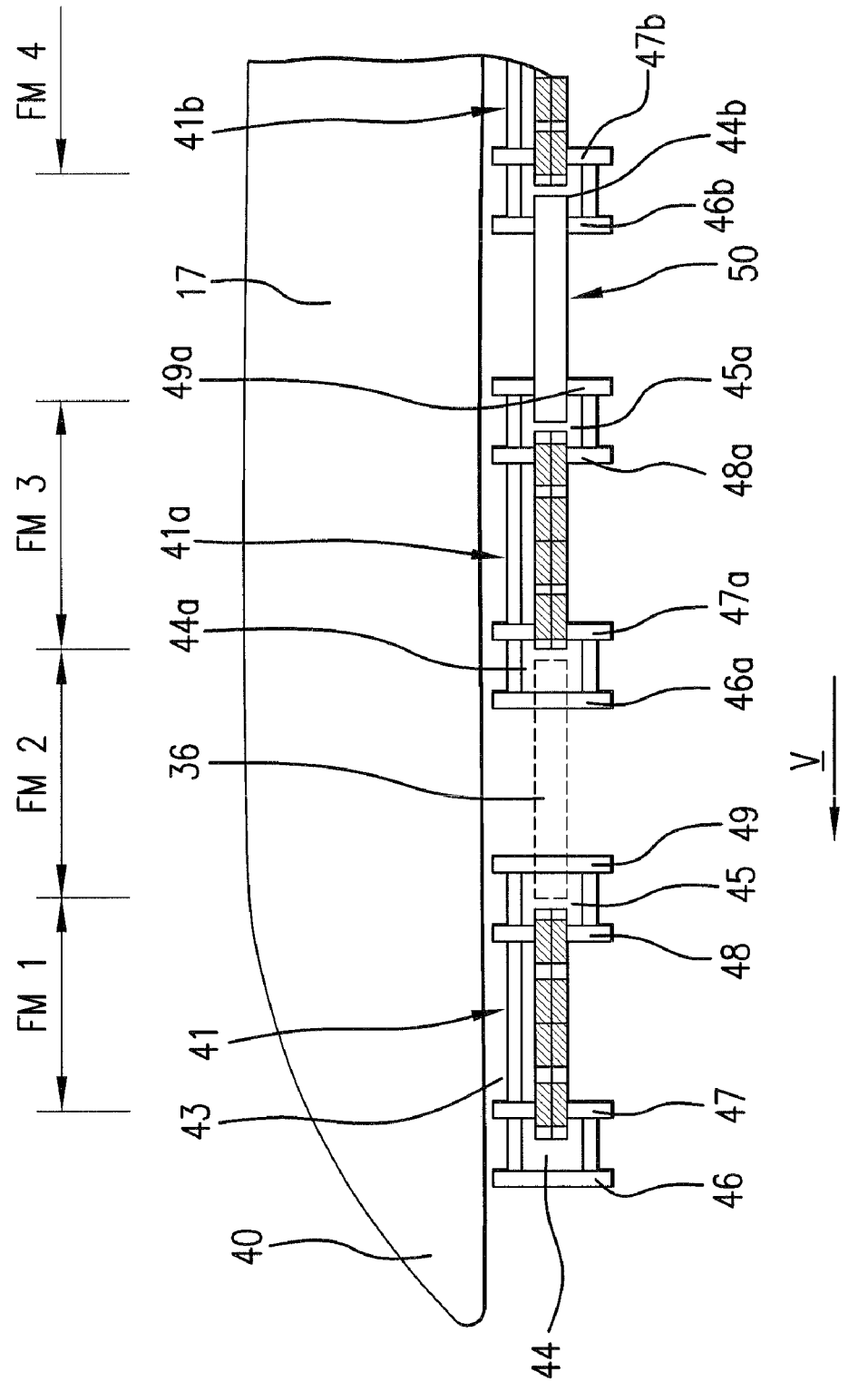

The invention is explained in greater detail as set forth below by means of embodiments and based on the drawings enclosed hereto, wherein:

FIG. 1 schematically shows a partial section through a usual magnetic levitation vehicle in the area of a guideway provided with a long stator;

FIG. 2 shows a perspective view of a module of a magnetic levitation vehicle with two magnet arrangements for the carrying and guiding function, respectively;

FIG. 3 schematically shows a control circuit for the magnet arrangements according to FIG. 2;

FIG. 4 schematically shows a partly cut, perspective view of the windings of the magnet arrangement of a guiding magnet according the present invention;

FIG. 5 shows a magnified detail X of FIG. 4 in a section and in conjunction with a lateral guide rail not shown on FIG. 4;

FIGS. 6 and 7 schematically show the set-up and efficiency of a guiding magnet system each according to the state of the art and according to a first embodiment of the present invention;

FIG. 8 schematically shows a side view of part of a magnetic levitation vehicle equipped with a guiding magnet system according to FIG. 7.

Figure 9:
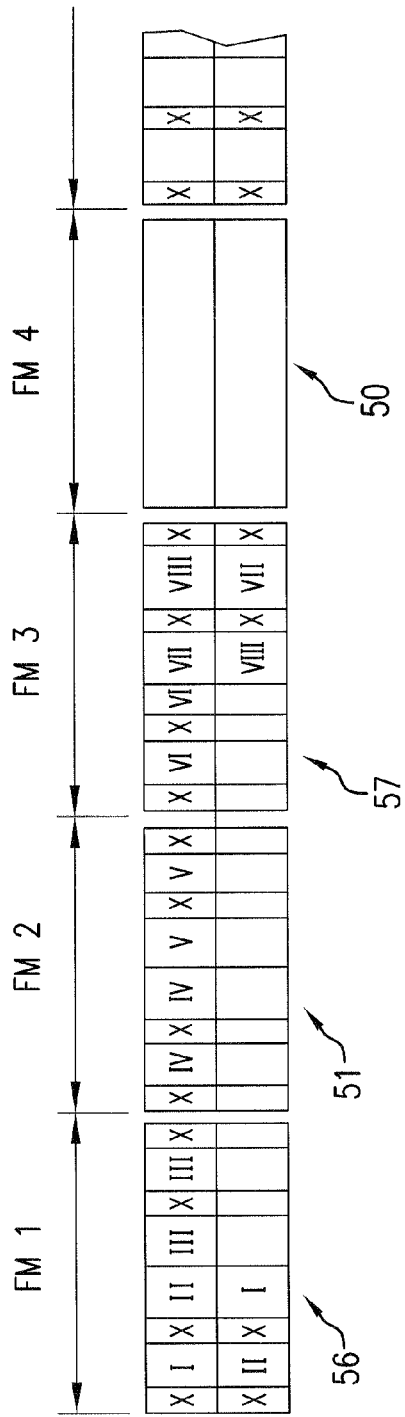

FIG. 9 in a schematic view corresponding to FIG. 7 shows the set-up of a second embodiment of the guiding magnet system according to the present invention, wherein a coil set each of a redundant half magnet shown in FIGS. 7 and 8 is placed into a magnet gap also provided in FIGS. 7 and 8.

Figure 10:
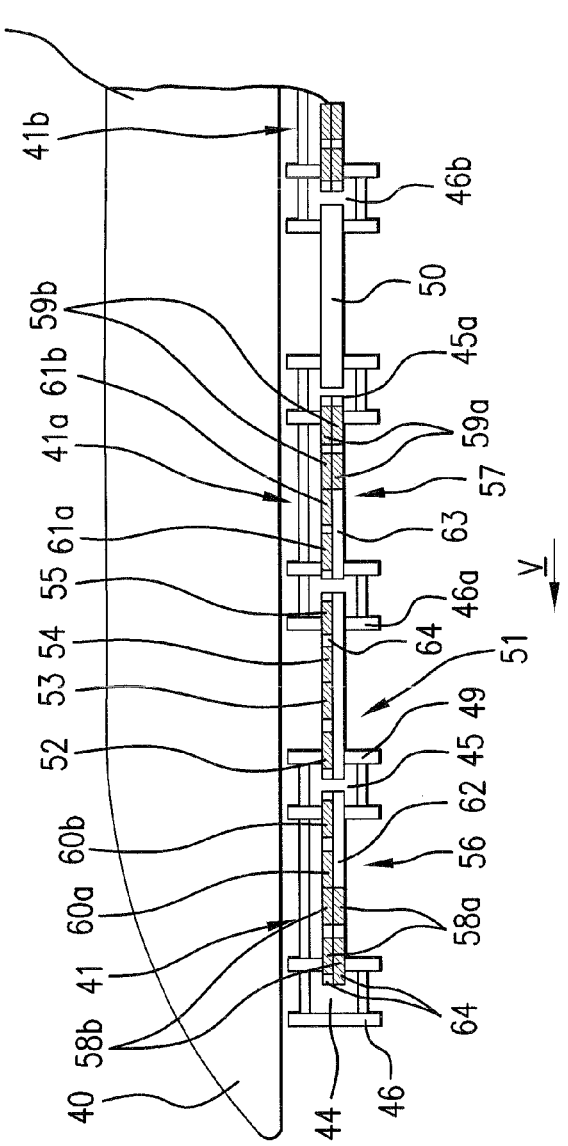
Figure 11:
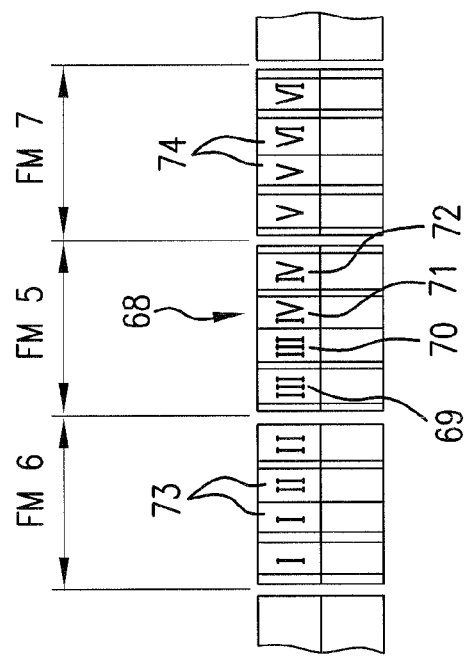
Figure 12:
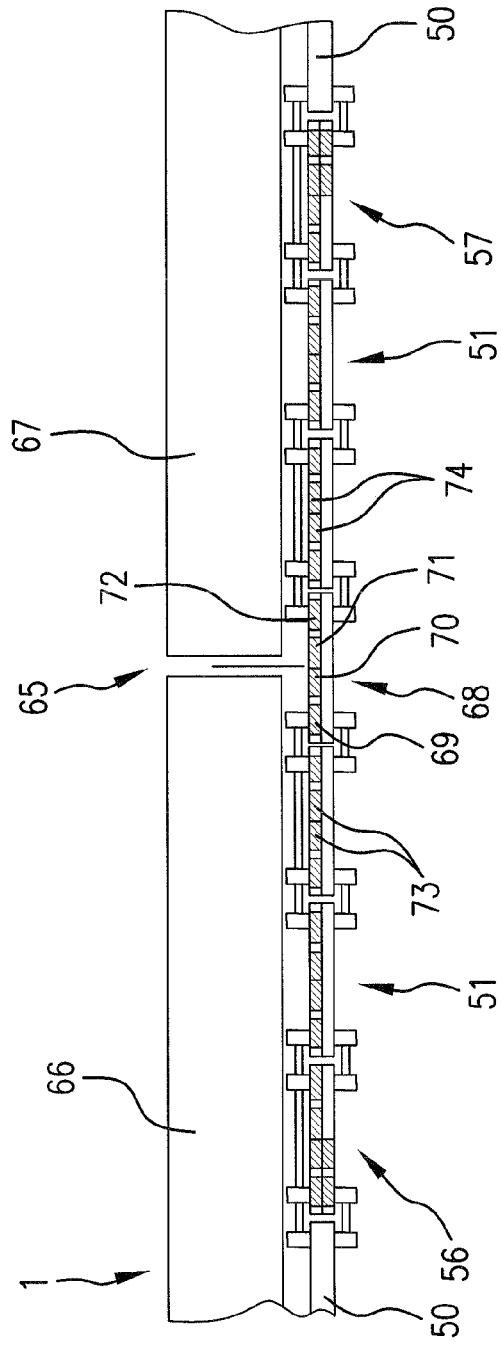

FIG. 10 schematically shows a side view of part of a magnetic levitation vehicle equipped with a guiding magnet system according to FIG. 9; and FIGS. 11 and 12 in views corresponding to FIGS. 9 and 10 show another embodiment in the area of the transition between two sections of a magnetic levitation vehicle according to the present invention.

FIG. 1 schematically shows a cross-section through a magnetic levitation vehicle 1 which is conventionally movably mounted on a guideway extending in longitudinal direction of a route, said guideway being comprised of beams (supports) 2 made of steel and/or concrete as well as guideway plates 3 mounted on it. The propulsion of the magnetic levitation vehicle 1 is effected by a long stator motor which is comprised of stator packets 4 affixed underneath the guideway plates 3 and arranged one behind the other in their longitudinal direction. The stator packets 4 are comprised of alternatingly succeeding teeth and grooves, only shown in FIG. 3, with windings being inserted therein that are fed with three-phase current of a variable amplitude and frequency. The actual excitation field of the long stator motor is generated by at least one first magnet arrangement acting as carrying (support) magnet 5 which is affixed by at least one lateral support bracket 6 to said magnetic levitation vehicle 1 and which is comprised of magnet poles facing the downwardly open grooves of the stator packets 4 as shown in FIG. 1. The carrying magnet 5 not only provides the excitation field, but also fulfils the function of carrying and levitation by maintaining a defined air gap 7 of e.g. 10 mm between said carrying magnet 5 and said stator packets 4 during operation of the magnetic levitation vehicle 1.

For the guidance of the magnetic levitation vehicle 1 the guideway plates 3 comprise laterally affixed guide rails 8, which are faced by at least a second magnet arrangement also mounted to the support brackets 6 and acting as guiding magnet 9, said magnet arrangement serving for maintaining a guiding gap 7a corresponding to gap 7 between itself and the guiding rail 8 during operation of the vehicle.

As shown on FIG. 2, the carrying magnet 5 and the guiding magnet 9 each form a module affixed to the support brackets 6, and each comprise a magnet arrangement 10 or 10a, respectively, for the functions of "carrying" and "guiding". However, it is obvious that a plurality of such modules can be mounted at the magnetic levitation vehicle 1 in lateral arrangement side by side and one behind the other as viewed in the direction of travel.

The magnet arrangement 10 for the "carrying" function is comprised of magnet poles 11 arranged one behind the other, whose windings 12 and cores 14 being schematically indicated in FIG. 2 for one of said magnet poles 11 are electrically connected in series and usually surrounded by a corrosion protection in form of a cast resin layer or the like. Said cores 14 of the individual magnet poles 11 are connected to each other by pole backs not shown and affixed by pole plates and rods penetrating through these pole plates, also not shown, to a magnet back box 15 of the magnet arrangement 10. Engaging to this magnet back box 15 via primary springs are the support brackets 6 (FIG. 1) which are connected with a bend-proof understructure or suspension frame 16 being comprised of longitudinal and transverse connectors and supporting a car body 17 of said magnetic levitation vehicle 1 (FIG. 1) being equipped with a passenger cell.

The magnet arrangement 10a correspondingly comprises magnet poles 11a bordering a common plane and being formed by cores and windings 12a assigned thereto, which are indicated in FIG. 2 only schematically and described in greater detail hereinafter.

Magnetic levitation vehicles 1 and their magnet arrangements are generally known to an expert, e.g. through printed publications U.S. Pat. No. 4,698,895, DE 39 28 277 A1, and PCT WO 97/30504 A1, which for sake of simplicity are made a part of the present disclosure by reference.

A control circuit 18 each according to FIG. 3 serves for controlling the windings 12, 12a of the magnet poles 11 and 11a to maintain the gap 7 and 7a constant during the ride of the magnetic levitation vehicle 1. This control circuit comprises at least one gap sensor, or preferably several gap sensors 19, 19a (see also FIG. 2) which border the same plane as the magnet poles 11, 11a, and which measure the actual size of the gap 7, 7a by inductive or capacitive means, and which serve as actual value transmitters for the control circuits 18.

The electrical signals transmitted by gap sensors 19, 19a are passed to controllers 20 according to FIG. 3 and compared therein with nominal values fed by a line 21 and being fixedly preset. Thereof, the controllers 20 determine the difference or actuator signals for actuators 22 which in turn control the current through the windings 12, 12a in such a manner that the gaps 7, 7a substantially take a constant size and maintain it during the ride.

To supply control loops 18 with the required operating voltage, power supply units 23 according to FIG. 3 are used which comprise batteries, linear generators, current collectors or the like provided in and/or at the magnetic levitation vehicle 1 and which are connected via voltage converters 24 to the controllers 20 and actuators 22 as well as to lines 26 that are linked to the on-board net.

According to FIGS. 4 and 5, a magnet arrangement 31 of a guiding magnet as proposed in the present invention preferably contains a core 33 extending in longitudinal or travelling direction of said magnetic levitation vehicle 1, said core 33 for example having an E-shaped cross-section and three shanks 33a, 33b, and 33c, whose free front faces are lying in one plane that defines the guiding gap 7a between the magnetic arrangement 31 and the lateral guide rail 8. The web segments of core 33 which connect the shanks 33a, 33b, and 33b, 33c respectively are wrapped with windings 34a and 34b in two winding planes arranged one above the other and also extending in the longitudinal direction as shown in FIG. 4. In longitudinal direction, the magnet arrangement 31 comprises four cores 33 each located one behind the other and, therefore, four windings 34a1 to 34a4 and 34b1 to 34b4 located one behind the other in each winding level. By analogy to FIG. 3, these windings 34 are activated by control circuits 18. For redundancy considerations, one gap sensor 19a each which is only shown in FIG. 2 is preferably assigned to each winding 34, wherein these gap sensors 19a expediently border the same plane as the shanks 33a to 33c. It is clear that within the modules of FIG. 2 each magnet arrangement 10a can be replaced with a magnet arrangement 31 according to this invention and having a corresponding length in the vehicle's longitudinal direction. Moreover, the gap sensors 19a that can be mounted as shown in FIG. 2 have been omitted in FIG. 4 for the sake of simplicity.

FIG. 6 gives a roughly schematic view of the control of the winding currents when the known magnet arrangement 10a according to FIG. 2 and having three windings 12a 1 to 12a6 each in two levels is used. Furthermore, FIG. 6 shows three magnet arrangements located one behind the other in the longitudinal direction, each of which corresponding to the magnet arrangement 10a and belonging to a guiding magnet FM1, FM2 and FM3. The windings are schematically shown as small boxes into which Roman figures have been entered which designate the numbers of the respective control circuits. Gap sensors 19a lying between the various windings are schematically delimitated by thick lines as shown in FIG. 6. The Roman figures indicate that those windings to which the same figure has been assigned are connected to each other in pairs and are connected in series to the relevant control circuit 18. For guiding magnet FM1 this means that the windings 12a4 and 12a2 are connected in series and linked to a control circuit I, that the windings 12a1 and 12a5 are connected in series and linked to a control circuit II, and that the windings 12a3, 12a6 are connected in series and linked to a control circuit III as shown in FIG. 3. Moreover, each control circuit 18 also comprises two gap sensors 19a each assigned to the relevant windings. A similar linkage is provided for the guiding magnet FM3. With the central guiding magnet FM2, on the contrary, the three windings 12a1, 12a4 and 12a5 on the one hand and the three windings 12a2, 12a3, and 12a6 on the other hand are connected in series and linked to a control loop IV or V each.

A consequence of the arrangement according to FIG. 6 is that only those windings 12a1, 12a4 and 12a3, 12a6 which are provided at the outer ends of the two guiding magnets FM1 and FM3 are redundant. In case of a failure of control circuit I or the pertinent windings 12a2 and/or 12a4, therefore, the function of the windings 12a1 and 12a5 lying there above or there under is maintained so that the control circuit II automatically ensures that the pertinent part of the guiding gap 7a remains constant. At the inner ends of the guiding magnets FM1 and FM3, on the contrary, redundancy does exist only to the extent as case of a failure, e.g. a failure of control loop III (or VI) and/or the pertinent windings, the adjacent central guiding magnet FM2 with its control circuits IV and V and the pertinent windings would have to take over also the function of the guiding magnet FM1 and/or FM3 and/or vice versa.

With the inventive arrangement according to FIG. 7 (and/or FIGS. 4 and 5), on the contrary, an even number of four windings 34a1 to 34b4 as well as the pertinent control circuits 18 as shown in FIG. 3 are provided in each winding plane. The control circuits are designated here by numbers I to VIII. It follows therefrom, that both the guiding magnet FM1 and the guiding magnet FM3 are intrinsically redundant. For FM1 four series circuits with the windings 34b1, 34a2 or 34a1, 34b2 or 34a3, 34b4 or 34b3 and 34a4, respectively, are provided, wherein the control of the winding pairs is effected by a control circuit I to IV each and the associated pairs of gap sensors. If the windings 34a1, 34b2 or 34b4, 34a3, respectively at the outer or inner end of the guiding magnet FM1 or the respective control circuits II or III fail to work, then this failure is compensated for by the pairs of windings 34b1, 34a2 or 34a4, 34b3, respectively, as well as by the respective control circuits I or IV, so that the guiding function is fully maintained. The same applies to the guiding magnet FM3.

Owing to the inventive distribution as described above of the windings and control circuits, the central guiding magnet FM2 in FIG. 7 in principle is not needed any longer, because in case of a failure it need not take-over any guiding function for the adjacent magnets FM1 and/or FM3 and because it would entail an excessive supply of guiding force during normal operation, provided that the guiding magnets FM1 and FM3 are sufficiently rated. Therefore, according to the invention, it is proposed to omit the central guiding magnet FM2 entirely from the guiding magnet system shown in FIG. 7 and instead to provide for a gap 36 which expediently has a length that corresponds to the length of the missing magnet arrangement 31. The gaps thus created are expediently covered by coverings 37, being shown in dashed lines in FIG. 7, being favourable with respect to flow and sound and being arranged between the guiding magnets FM1 and FM3. Besides, the gaps 36 are expediently provided at those points of the magnetic levitation vehicle 1 where requirements are the lowest, i.e. for example between the hinge points of the suspension frame 16 (FIG. 1).

FIG. 7 further shows that contrary to FIG. 6 there are two pairs of windings each at both ends of the magnet arrangements 31, said pairs being formed by two windings each (e.g. 34b1, 34a2 or 34a1, 34b2) that are arranged immediately next to each other in the longitudinal direction but diagonally above each other. Between these pairs of windings, there can be further pairs of windings, wherein for redundancy considerations preference is given to an even number of additional pairs of windings, which are intrinsically redundant at the ends like the pairs of windings.

Two advantages thus obtained from the inventive arrangement become evident when comparing FIG. 6 and FIG. 7. To begin with, FIG. 6 shows that for example in case of a failure of control loop IV or V a rolling moment around the vehicle's longitudinal axis might occur, because the remaining magnet poles provided with windings 12a2, 12a3 and 12a6 or 12a1, 12a4 and 12a5 in the two winding levels are asymmetrically arranged. Conversely, with the arrangement of FIG. 7 such asymmetry in case of a failure of any coil pair or the pertinent control circuit I to VIII does not occur. This is similarly true for the position of the central point of force attack (=point of application of force). For example, if the control circuit III on FIG. 6 fails to work, the point of force attack of the guiding magnet FM1 shifts towards the left as shown on FIG. 6. With the arrangement according to FIG. 7, on the contrary, no essential change would occur in case of a failure of control loop III, particularly if that part of the force which is caused by to the magnet poles which have failed is nearly entirely compensated for by increasing the winding currents in the magnet poles belonging to the control loop IV.

If implemented in practice, the arrangement shown on FIG. 8 is roughly obtained for the embodiment of FIG. 7. The travelling direction of the magnetic levitation vehicle 1 is designated by an arrow v, its nose or front end with the reference numeral 40. Furthermore, some suspension frame sections 41, 41a, 41b of the suspension frame 16 (FIG. 1) are shown in a roughly schematic view, arranged one behind the other in the longitudinal direction of vehicle 1 and coupled via pneumatic springs not shown, to the car body 17 of the magnetic levitation vehicle 1. In their longitudinal direction, the suspension frame sections 41, 41a, 41b have supporting elements 44, 45 in form of frame parts that are arranged at a certain distance to each other and connected by longitudinal girders 43, and that are provided with a front-end and a rear-end supporting part 46, 47 or 48, 49 each. In the embodiment, the guiding magnet FM1 being on the front in travelling direction is so connected to the suspension frame section 41 that its front end is connected to the rear supporting part 47 of the front supporting element 44, while its rear end is connected to the front supporting part 48 of the rear supporting element 45 in hinged arrangement, as is clearly shown on FIG. 8. The next guiding magnet FM2 is usually connected at its front end to the rear supporting part 49 of the rear supporting element 45 of the suspension frame section 41, and at its rear end it is connected to the front supporting part 46a of the front supporting element 41a of the suspension frame section 41a following next in travelling direction. The arrangement as described hereinabove can be continued along the whole magnetic levitation vehicle 1 from the nose to the tail. However, preference is given to installing a braking magnet 50 after the third guiding magnet FM3 along a section which corresponds to the length of a guiding magnet, said braking magnet forming a zone being free from any guiding magnet and, for example, being part of an eddy-current brake which also cooperates with the guiding rail 8. Thus, at this location the engagement e.g. of guiding magnet FM3 at the rear supporting part 49a of supporting element 45a is missing in the same way as the front end supporting part 46 of the front supporting element 44 in the nose area 40 is not coupled to a guiding magnet, because the guiding magnet FM1—viewed in the direction of travel—is also succeeded by a zone free from a guiding magnet. The arrangement is similar on the right side as shown in FIG. 8, i.e. on the side lying behind the braking magnet 50 in the direction of travel. Moreover it is obvious that in FIG. 8 only one side, i.e. the left side of the magnetic levitation vehicle 1 in the direction of travel is shown and that on the right side which is not visible in FIG. 8 there are corresponding guiding magnets and other braking magnets, if any.

Apart hereof, FIG. 8 shows that the guiding magnet FM2, in correspondence with the above description, is missing so that a gap 36 is created there as shown in FIG. 7. The same is valid for the vehicle section located to the right of braking magnet 50 as shown in FIG. 8. The non-existence of the guiding magnet FM2 or corresponding other guiding magnets may be useful, e.g. whenever a guiding magnet according to FIG. 8 is situated between two suspension frame sections 41, 41a or other vehicle sections where less requirements are requested from the forces to be applied by the guiding magnets. Guiding magnet FM2 in this area would therefore only lead to an actually not required surplus supply of windings. By omitting the guiding magnet FM2, no noticeable adverse effect on the guiding properties would be obtained. It is advantageous, however, that roughly one third of the weight needed for the guiding magnets and mainly resulting from their ferrous parts will be saved in the arrangement shown in FIG. 8.

A problem resulting from the arrangement according to FIG. 8 is that an uneven introduction of forces into the suspension frame 16 (FIG. 1) will be obtained. This results in yawing moments that are absorbed by the suspension frame 16 and the car body 17 and/or the track (FIG. 1), but which might nevertheless be undesirable. With a magnetic levitation vehicle 1 having a central braking magnet 50 and three guiding magnets FM1 to FM3 each located upstream and/or downstream thereof, a total of eight load changes would result in each case, if the central guiding magnets were missing i.e. two at the ends two of the magnetic levitation vehicle 1, two at each gap 36, and two each in the area of the braking magnet 50. This is not desired, particularly for magnetic levitation vehicles 1 riding at high speed, because of the forces exerted onto the track 3.

Therefore, according to another embodiment of the present invention shown in FIGS. 9 and 10, a guiding magnet FM2 is again provided in the gap 36 according to FIGS. 7 and 8. However, in order to allow for savings in weight as shown on FIGS. 7 and 8, a magnet arrangement 51 of this guiding magnet FM2 has a total of only four windings 52 to 55 lying one behind the other and being expediently located in one and the same winding plane. The ends of the guiding magnet FM2 are connected with the supporting parts 49 and 46a (FIG. 10) which remained free in the embodiment of FIG. 8. Moreover, two windings each are omitted in magnet arrangements 56, 57 of the adjacent two guiding magnets FM1 and FM3 as compared with FIG. 7 and FIG. 8. At the first ends remote from guiding magnet FM2, the magnet arrangements 56, 57 as shown in FIG. 7 have two pairs of windings 58a, 58b and 59a, 59b each, while at the second end facing the guiding magnet FM2 they have two windings 60a, 60b and 61a, 61b located in the same or in different plans, but one behind the other, and besides they have two blanks portions 62 and 63 each. The windings 60a, 60b and 61a, 61b each form a third pair of windings of the magnet arrangements 56 and 57 and are serially connected to an assigned control circuit III and VI, respectively. In a similar manner, two windings 52, 53 or 54, 55 of the guiding magnet FM2 lying one behind the other are connected in pairs and in series to a control circuit IV or V each. The advantage thus obtained is that at particularly exposed areas characterized by magnet-free zones, e.g. in the areas bordering the front end 40 and the braking magnet 50 of vehicle 1, two pairs of windings each diagonally connected analogously to FIG. 7 and FIG. 8 lead to a redundancy of the system in itself. In all less exposed areas lying there in between, the relevant adjacent pair of windings (e.g. 52, 53) must supply the required magnetic force in case of a failure of a pair of windings (e.g. 60a, 60b ) and/or of the pertinent control circuit and vice versa as shown in FIG. 6. The respective schematic representation analogously to FIG. 6 and FIG. 7 is found in FIG. 9, with the relevant gap sensors being indicated in FIG. 9 by an X and in FIG. 10 by blanks 64.

The embodiment of FIG. 9 and FIG. 10 yields two essential advantages. On the one hand, the number of load changes per vehicle 1 is reduced by four, while the weight of the guiding magnets as shown on FIG. 8 is reduced by approximately one third, because there are only 16 instead of 24 windings which would be provided in the embodiment of FIG. 7 if the gap 36 were filled by complete guiding magnet FM2. It is further to be noted that with respect to the operating strength of track 3, the load changes at transitions from maximum load to zero load are far more critical than they are at transitions from maximum load to half load and/or reduced load, because the pre-tensioning is in principle continuously maintained in the latter case. The last mentioned load changes therefore remain disregarded in this contemplation. And it is clear that even two or more third magnet arrangements 51 may exist between the two magnet arrangements 56, 57.

FIGS. 11 and 12 finally show an embodiment of the invention considered best at present. Here it has been considered that transitional areas 65 between two sections 66, 67 of a magnetic levitation vehicle 1 coupled to each other and running one behind the other also form zones that are free from guiding magnets and which lead to critical load changes. For redundancy considerations, these transitional areas 65, when applying the embodiments of FIGS. 7 and 10, are usually treated as magnet-free zones in the same way as those areas bordering the nose area 40 or a braking magnet 50, respectively, i.e. two diagonally connected pairs of windings each (e.g. 58 or 59 in FIG. 10) are provided for there. Contrary, in the embodiment of FIG. 11 and FIG. 12 it is proposed to provide a guiding magnet FM5 having a magnet arrangement 68 in every transitional area 65, said magnet arrangement 68 having four windings 69 to 72 lying one behind the other as in the magnet arrangement 51 (FIG. 10). Accordingly, two windings each, e.g. 69 and 70, are arranged at the rear end of the one section 66 and the other two windings, e.g. 71 and 72, at the front end of the next section 67 and, for example, all of them are arranged in the same winding plane. Moreover, a guiding magnet FM6 bordering the rear end of the forerunning section 66 and one guiding magnet FM7 bordering the front end of the trailing section 67 is provided with magnet arrangements 73 and 74, respectively, which are also merely composed of four windings lying one behind the other and preferably arranged in the same winding plane, connected in pairs according to FIG. 11, and linked to assigned control circuits. Thus, it is achieved—without enhancing the weight as compared with FIG. 9 and FIG. 10—that there is a continuous, uninterrupted band of windings or a continuous magnetic flow band between two hitherto magnet-free zones. In this band, the windings are located individually one behind the other, with the consequence that a constant break-off and new build-up of the magnetic flow is avoided and that load changes and moments to be considered can occur only where magnet-free zones are unavoidable as at the beginning or end of a magnetic levitation vehicle or at the braking magnets. It is further clear that the arrangement described in FIGS. 9 and 10 for the nose area 40 can also be provided in the tail area, particularly so if the magnetic levitation vehicle 1 is configured symmetrically to the vehicle centre and for movement in two opposite directions. Moreover, it is advantageous that nearly all supporting parts of the suspension frame sections 41, 41a etc. are connected to a magnet arrangement each.

With a particularly preferred embodiment example of the invention, the windings and cores provided at the nose or tail of the magnetic levitation vehicle 1, e.g. 34 and 33 in FIG. 4, are longer than those in other areas of the magnetic levitation vehicle 1. This is done to consider the circumstance that an increased demand for guiding forces exists there during curve rides, depending on the direction of travel.

The invention is not limited to the embodiments described hereinabove that can be modified in a plurality of ways. In particular, this applies to the described shape of the cores and windings of the magnet arrangements and to the other configuration of the guiding magnets. Furthermore, in addition to the described magnet arrangements, it is also possible to provide other and/or differently configured magnet arrangements, if they do not substantially affect the described functions of the guiding magnet system. To this effect it is in principle sufficient to provide each magnet arrangement only with the described windings. The length of the magnet arrangements measured in the vehicle's longitudinal direction expediently is equal everywhere in accordance with a preselected matrix (raster) length. Moreover, it is self-explanatory that the different features can also be applied in combinations other than those described and shown hereinabove.

The invention claimed is:

1. A guiding magnet system for a magnetic levitation vehicle (1) having at least one magnet arrangement (31, 56, 57) which comprises a core (33) extending in the vehicle's longitudinal direction between a first and a second end, said core having at least two winding levels (planes) lying one above the other for a plurality of windings (34, 58 to 61), wherein at the first end said magnet arrangement (31, 56, 57) is provided in at least two of the winding levels with two windings each lying one behind the other (34, 58 to 61) in such a manner that two windings lying one behind the other in the vehicle's longitudinal direction and diagonally above each other and being connected in series, form one first and/or second pair of windings (e.g. 58a, 58b and/or 59a, 59b) each linked to an assigned control circuit (18), characterized in that said magnet arrangement (31, 56, 57) at the second end has at least two windings which are arranged one behind the other in the vehicle's longitudinal direction, are electrically connected in series and form a third pair of windings (e.g. 60a, 60b and/or 61a, 61b) that is connected to a further assigned control circuit (18).

2. A guiding magnet system according to claim 1, characterized in that it has at least two such magnet arrangements (56, 57) each bordering a zone free from a guiding magnet (e.g. 50) and facing each other with their second ends, and that at least a third magnet arrangement (51) is provided between these two magnet arrangements (56, 57) and comprises at least four windings each (52 to 55) lying one behind the other in the vehicle's longitudinal direction, wherein two windings (52, 53 or 54, 55) lying immediately one behind the other are electrically connected in series and linked to a further assigned control circuit (18).

3. A guiding magnet system according to claim 1, characterized in that the magnet arrangements (31) at the second end are provided in at least two the winding levels with two windings each (34a3, 34a4 or 34b3, 34b4) lying one behind the other in such a manner that two windings lying one behind the other in the vehicle's longitudinal direction and diagonally one above the other are electrically connected in series and form one pair of windings (e.g. 34a3, 34b4 or 34a4, 34b3) connected to a further assigned control circuit (18).

4. A guiding magnet system according to claim 3, characterized in that in the vehicle's longitudinal direction a plurality of magnet arrangements (31) is so arranged one behind the other that a gap (36) exists between selected magnet arrangements (31).

5. A guiding magnet system according to claim 4, characterized in that the gap (36) has a length that corresponds to the length of the magnet arrangements (31).

6. A guiding magnet system according to claim 4, characterized in that the gaps (36) are covered by covering parts (37).

7. A magnetic levitation vehicle having a guiding magnet system comprising at least one magnet arrangement (31, 56, 57), characterized in that the guiding magnet system is configured according to claim 1.

8. A magnetic levitation vehicle according to claim 7, characterized in that in its middle area it has at least one zone (50) free of guiding magnets and that only magnet arrangements (51, 56, 57) according to claim 2 are provided between this zone (50) and a nose or a tail area (40) also forming a zone free of guiding magnets.

9. A magnetic levitation vehicle according to claim 8, characterized in that the zones (50) free of guiding magnets are formed by intermediately arranged braking magnets.

10. A magnetic levitation vehicle according to claim 7, characterized in that it has a zone (50) free of guiding magnets in a middle area and that only magnet arrangements (31) according to any of the preceding claims 3 to 6 are provided between this zone (50) and a nose or tail area (40) also forming a zone free of guiding magnets.

11. A magnetic levitation vehicle according to claim 7, characterized in that it has at least two sections (66, 67) arranged one behind the other in the vehicle's longitudinal direction, wherein transitional areas (65) between these sections (66, 67) each form a further zone free of guiding magnets.

12. A magnetic levitation vehicle according to claim 11, characterized in that a magnet arrangement (68) each, configured like the third magnet arrangement (51) according to claim 2, is provided in the transitional areas (65) between two sections (66, 67), said third magnet arrangement (51) comprising at least four windings (69 to 72) arranged one behind the other in the vehicle's longitudinal direction.

13. A magnetic levitation vehicle according to claim 12, characterized in that it has only the nose and/or tail areas (40) and, if any, braking magnets (50) arranged there between to serve as zones free of guiding magnets, wherein magnet arrangements (56, 57) according to claim 1 border the zones free of guiding magnets, whereas only magnet arrangements (68) corresponding to the third magnet arrangements (51) are provided between the magnet arrangements (56, 57) including the transitional areas (65) between the sections (66, 67).

14. A magnetic levitation vehicle according to claim 12, characterized in that the magnet arrangements (56, 68, 57) between the nose and/or tail areas (40) form a continuous band of magnetic flux over the length of the vehicle, which band is interrupted, if at all, only by the braking magnets (50).

15. A magnetic levitation vehicle according to claim 7, characterized in that the magnet arrangements (31, 56, 57) bordering the nose and/or tail area (40) are provided with windings and cores that are extended in the vehicle's longitudinal direction as compared with the other magnet arrangements.

* * * * *